United States Patent [19]

Hopper

[11] 4,108,461
[45] Aug. 22, 1978

[54] BICYCLE SPINDLE

[76] Inventor: James H. Hopper, 1 Taylor Rd., Hazardville Station, Enfield, Conn. 06082

[21] Appl. No.: 784,907

[22] Filed: Apr. 5, 1977

[51] Int. Cl.² ............... B62K 21/16; B62K 21/20
[52] U.S. Cl. ..................... 280/279; 74/551.3; 403/104; 403/374
[58] Field of Search ............ 280/279, 281 R; 403/104, 374, 370, 409; 74/551.1–551.9

[56] References Cited

U.S. PATENT DOCUMENTS

| 2,349,933 | 5/1944 | Barry | 403/370 |
| 3,556,544 | 1/1971 | Hauser | 403/104 |
| 3,649,054 | 3/1972 | McClenan | 403/374 |
| 3,787,126 | 1/1974 | Arlen | 280/279 X |
| 3,865,095 | 2/1975 | Helmick | 403/374 X |

FOREIGN PATENT DOCUMENTS

| 423,744 | 2/1911 | France | 74/551.2 |
| 505,878 | 5/1920 | France | 74/551.1 |

Primary Examiner—Kenneth H. Betts
Attorney, Agent, or Firm—Albert L. Jeffers

[57] ABSTRACT

A handlebar system for connecting the bicycle handlebar to the front fork structure in which the portion of the stem in the front fork structure is expandable by the use of a rubber block inside the said stem shank while the connection of the handlebar to the stem is effected by a cap mounted on the stem and removable therefrom to release the handlebar.

6 Claims, 2 Drawing Figures

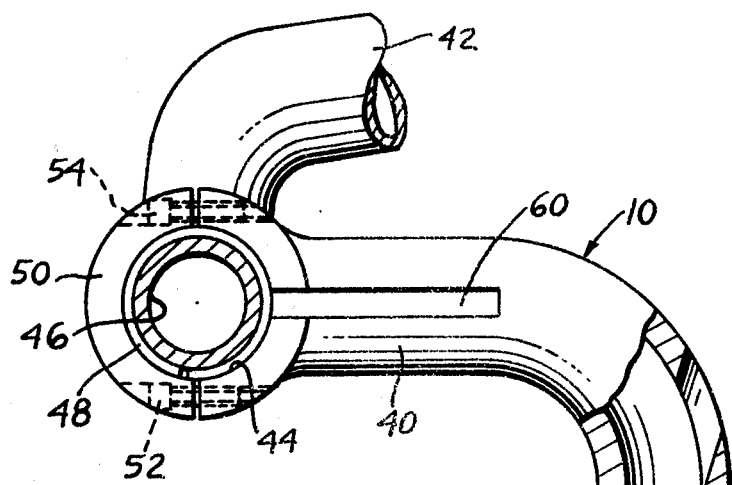
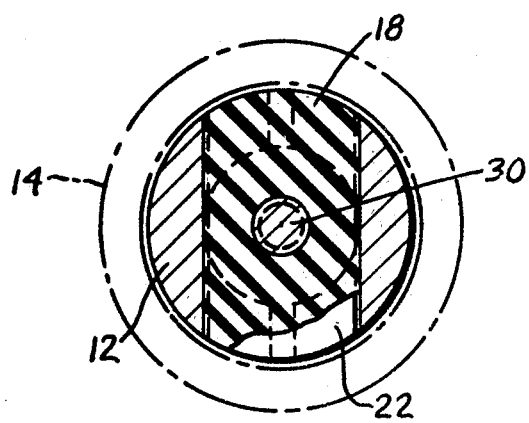
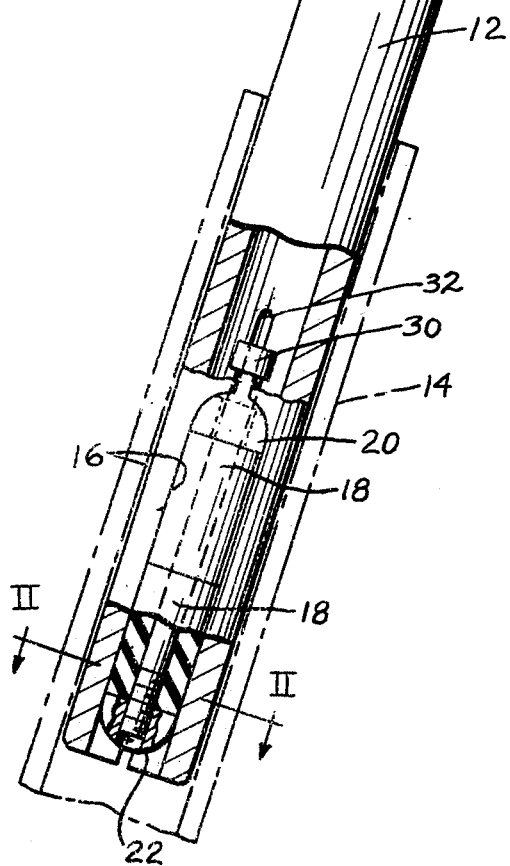

BICYCLE SPINDLE

The present invention relates to stems for bicycles and especially to an improved construction therefor.

Stems for bicycles are known and, in general, comprise an angular element, one leg of which is connected with the upper end of the fork structure of the bicycle frame which supports the front wheel of the bicycle and which is rotatably supported by the main part of the frame.

This last-mentioned portion of the stem is substantially coaxial with the axis of rotation of the fork while the stem includes a forwardly projecting leg at the outer free end of which there is connected the handlebars of the bicycle.

Normally, a steel tapered element is disposed in the lower end of the first portion of the stem and is adapted to be drawn upwardly by a bolt so as to expand the stem to cause it to grip the upper portion of the bicycle fork which is a tubular extension at the upper end of the fork that is rotatably journaled in the bicycle frame. The stem is slit in the axial direction of the portion engaged by the wedge so that it can expand and contract.

The free end of the other portion of the stem is usually axially slit and provided with a bore through which the handlebar can be entrained by inserting it endwise into the hole. A single screw in the free end of the last-mentioned part of the stem is provided for drawing the stem tight about the handlebar.

The foregoing construction has proved effective for the reason that expansion of the vertical leg of the stem in the described manner provides only for line engagement with the upper end of the bicycle fork, whereas the arrangement for connecting the handlebar to the stem is defective for the reason that, if the handlebar includes handgrips, or tape, and brakes, for example, such handgrips must be removed before the handlebar can be removed from the stem, or before the handlebar can be inserted into the stem.

The primary object of the present invention is the provision of an improved bicycle stem construction which avoids the defects referred to above.

BRIEF SUMMARY OF THE INVENTION

According to the present invention, an angular member having a first leg adapted for insertion in the tubular upper end of a bicycle fork is provided with the angular member having a forwardly extending leg with an upwardly opening cut out for receiving the central portion of a handlebar. A cap is removably mounted on the outer end of the other leg for clamping the handlebar thereto in adjusted position.

The first mentioned leg is axially split and has a block of rubber-like material inserted therein. A bolt extends downwardly through the last-mentioned leg and engages a nut at the bottom which is nonrotatable but axially slidable in the respective leg portion. A bolt extending axially along the leg of the stem, or spindle, containing the rubber block and nut is threaded into the nut so that rotation of the bolt will compress the block of rubber, causing it to expand, and simultaneously expanding the split leg into gripping engagement with the upper end of the fork.

The rubber block provides for a substantial area of engagement of the spindle with the fork and greatly improves the connection of the spindle with the fork.

The exact nature of the present invention will become more clearly apparent upon reference to the following detailed specification taken in connection with the accompanying drawings in which:

FIG. 1 is a side view, partly in section, of a spindle, or stem, constructed according to the present invention.

FIG. 2 is a plan sectional view indicated by line II—II on FIG. 1.

DETAILED DESCRIPTION OF THE INVENTION

Referring to the drawings somewhat more in detail, the spindle, or stem, according to the present invention, indicated generally at 10, has a generally vertical first portion 12 extending into the cylindrical upper end part 14 of the front fork of a bicycle. As is shown, portion 14, which is merely schematically illustrated in the drawings, is journaled in the front of the bicycle frame and at the bottom embodies the fork in which the front steerable wheel of the bicycle is mounted.

Leg portion 12 of the spindle is provided with an axial slot 16 extending upwardly from near the bottom and in which a rubber-like block 18 is mounted. Block 20 in slot 16 engages the upper end of rubber block 18 and a block 22 in the slot engages the lower end of block 18.

A bolt 30 extends axially through the leg 12 and is threaded into block 22, and when tightened up through the opening in the neck, will cause block 18 to expand thereby to expand the split lower end of leg 12 and cause it to grip the inside of part 14 over a substantial area. To enhance the spreading apart of the lower end of leg 12, a split portion 32 may be provided extending upwardly into leg 12 from the upper end of slot 16.

The spindle 10 also comprises a substantially horizontally extending leg 40 at the outer end of which there is supported the handlebar 42. Leg 40 at the outer end has an outwardly opening, substantially semicircular, pocket 44 in which the central portion 46 of the handlebar is disposed. Central portion 46 usually has a knurled sleeve 48 mounted thereon which is engaged by the spindle 10.

According to the present invention, a semicircular cap 50 is provided which, together with recess 44, defines the cavity in which knurled sleeve 48 is received. Cap screws 52 and 54 are provided which clamp cap 50 in place on spindle 10 and which, when removed, permit cap 50 to be lifted off and handlebar 42 to be removed bodily from spindle 10.

The arrangement of the present invention is inexpensive and provides for simple servicing of the bicycle while, at the same time, considerably improving the connection of the spindle to the bicycle fork structure. The spindle which connects the handlebar to the front fork of the bicycle is somewhat similar in configuration and in manner of construction to the structure that supports the bicycle seat at the rear of the frame.

It will be evident that the same expansible rubber block arrangement could be employed for connecting the seat support structure to the bicycle frame if so desired.

It will be noted that the horizontal extending leg of the stem or spindle comprises a cavity 60 extending rearwardly from the handlebar recess formed in the front end thereof. The recess 60 reduces weight of the assembly but does not materially change the strength of the stem.

Modifications may be made within the scope of the appended claims.

What is claimed is:

1. In a spindle for connection to the upper region of a bicycle frame, a leg adapted for insertion into the frame from above, a slot formed in the lower portion of said leg, a resilient block in said slot, means accessible from the upper end of said leg for compressing said block axially thereby to expand said block radially to spread said lower portion of said leg, a rigid element fitted into each end of said slot at opposite ends of said block and said means comprises a screw threaded into the lower one of said elements and having a head thereon in the upper side of the upper of said elements.

2. A spindle according to claim 1 in which said frame has a front fork with a cylindrical upper portion and into which said leg is inserted.

3. A spindle according to claim 1 in which said lower element comprises a nut at the lower end of the block captive against rotation in the lower end of the said leg, and said screw comprises a bolt threaded into said nut and extending upwardly through said block.

4. A spindle according to claim 1 which includes an axial slit formed in said leg from the bottom of said slot to impart resilience to said leg.

5. A spindle according to claim 1 in which said spindle includes a second leg extending at an angle to said one leg from the upper end thereof, an arcuate recess near the free end of said second leg to engage a handlebar, and a recessed cap to clamp the handlebar thereto and separately connected thereto.

6. A spindle according to claim 1 which includes said leg having axial bore thereon providing access to said head for rotation thereof.

* * * * *